United States Patent [19]

Bublitz et al.

[11] 4,036,256
[45] July 19, 1977

[54] ADJUSTABLE VALVE ASSEMBLY

[75] Inventors: Arthur T. Bublitz, Saline, Mich.; Eugene F. Holben, Haddonfield, N.J.

[73] Assignee: Reliance Electric Company, Pepper Pike, Ohio

[21] Appl. No.: 684,860

[22] Filed: May 10, 1976

Related U.S. Application Data

[62] Division of Ser. No. 602,245, Aug. 6, 1975, Pat. No. 3,982,726.

[51] Int. Cl.² ............................................. F16K 31/04
[52] U.S. Cl. .................................... 137/595; 251/133
[58] Field of Search ................ 137/595; 251/133, 134; 91/413

[56] References Cited

U.S. PATENT DOCUMENTS

2,958,310  11/1960  Shoosmith ........................... 137/595

*Primary Examiner*—Arnold Rosenthal
*Attorney, Agent, or Firm*—Woodling, Krost, Granger & Rust

[57] ABSTRACT

An adjustable valve assembly as disclosed wherein a plurality of valve blocks may be stacked or ganged side by side, and each used to control a machine part. Each valve block has a solenoid actuated valve to control flow of fluid such as air into a piston and cylinder assembly to move a part of the machine. The air flow is adjustably throttled by a needle valve in either the forward stroke or return stroke of the machine part. The needle valve has a normal at-rest position and may be moved in two directions toward opening and toward closing to establish a variable orifice in the valve block. First and second line shafts extend transversely to all of the various valve blocks for actuating the needle valves in the several valve blocks. Such actuation includes for each valve block first and second drive trains from the line shafts to the needle valve member with first and second clutches in the first and second drive trains and selectively actuable for opening and closing movements of the valve member.

7 Claims, 3 Drawing Figures

ADJUSTABLE VALVE ASSEMBLY

This is a division of application Ser. No. 602,245 filed Aug. 6, 1975, now U.S. Pat. No. 3,982,726.

The foregoing abstract is merely a resume of one general application, is not a complete discussion of all principles of operation or applications, and is not to be construed as a limitation on the scope of the claimed subject matter.

BACKGROUND OF THE INVENTION

Many machines require fluid actuated motors such as piston and cylinder assemblies to move parts of the machine. Also, in many cases such as in individual section glassware making machines, the speed of movement of the machine part needs to be precisely controllable. In the forward movement of the machine part this if often called velocity control, and in the return stroke of the machine part this is often called cushioning control. In either case, it is a variable orifice adjustment of the needle valve which controls the restriction to the fluid flow, and, hence, controls the speed of movement of the machine part.

In the prior art such as in individual section glassware making machines, many such valve assemblies are required, for example, a gang of twenty-one such valve block assemblies may be mounted side by side for operation from the same air pressure source. In the past, to adjust the variable orifice fluid flow restriction, this neddle valve adjustment was accomplished manually by an aritsan who adjusted the throttling or cushioning in order to achieve a precise timed relationship of the machine part relative to the movements of all of the rest of the parts of the machine. In such glassware making machine it will be appreciated that there are many machine parts, all of which must be interrelated, for example, the gob feeder which feeds a gob of heated glass, the parison formation, the transfer to a blow mold station, the action of the molds including opening and closing of the parison and the blow molds, the take-away conveyor and so forth. In the prior art, these inter-related timed motions were controlled by a manually adjustable needle valve.

Such manual adjustment relied almost completely upon the skill of an artisan with long experience in order to operate the machine with a high degree of precision in the inter-related movements without a lot of broken glassware and scrap. The prior art glassware making machines typically operated at about 60 to 80 percent efficiency, the rest being scrap in one form or another and much of this was due to the fact that it was quite difficult to properly adjust the manually adjustable needle valves. Also, each time the machine was changed to make a different form of glassware, all of the ganged valve block assemblies had to be changed in their adjustments, and this was a long procedure in the setup before the machine was producing the new type of glassware at a satisfactory rate.

Accordingly, an object of the invention is to provide a motor-operated needle valve.

Another object of the invention is to provide an adjustable valve assembly wherein line shaft means is disposed transversely to the movement of a valve member and is connected to operate such valve member.

Another object of the invention is to provide a ganged valve assembly with a plurality of valve blocks each having a valve member operable from two line shafts extending transversely to the plurality of valve blocks.

Another object of the invention is to provide a valve assembly wherein first and second line shafts are provided for selectively actuating a valve member in opening and closing directions.

Another object of the invention is to provide an adjustable valve assembly with transverse line shaft means and first and second clutch means connecting the line shaft means to an adjustable valve member for opening and closing movements respectively.

SUMMARY OF THE INVENTION

The invention may be incorporated in an adjustable valve assembly including a valve body, a valve seat in said body, a valve member in said valve body movable along a first axis in two directions relative to said valve seat to establish a variable orifice therewith, a movable shaft means in said body movable in a first plane containing said first axis, means interconnecting said movable shaft means and said valve member for concurrent movement, a motor, line shaft means connected to be driven by said motor and journalled for rotation about a second axis in a second plane substantially normal to said first axis, first and second drive trains from said line shaft means to said movable shaft means, first and second clutch means in said first and second drive trains, respectively, actuator means having a neutral position intermediate first and second actuated positions along first and second different paths, respectively, and connected to actuate said first and second clutch means, respectively, control means conçonnected control said actuator means and having first and second conditions and a third neutral condition of non-actuation of said actuator means, and said first and second conditions of said control means connected to control said actuator means for movement along said first and second paths, respectively, to actuate said first and second clutch means, respectively, for opening and closing movements, respectively, of said valve member.

Other objects and a fuller understanding of the invention may be had by referring to the following description and claims, taken in conjunction with the accompanying drawing.

DESCRIPTION OF THE PREFERRED EMBODIMENT

Figure 1:
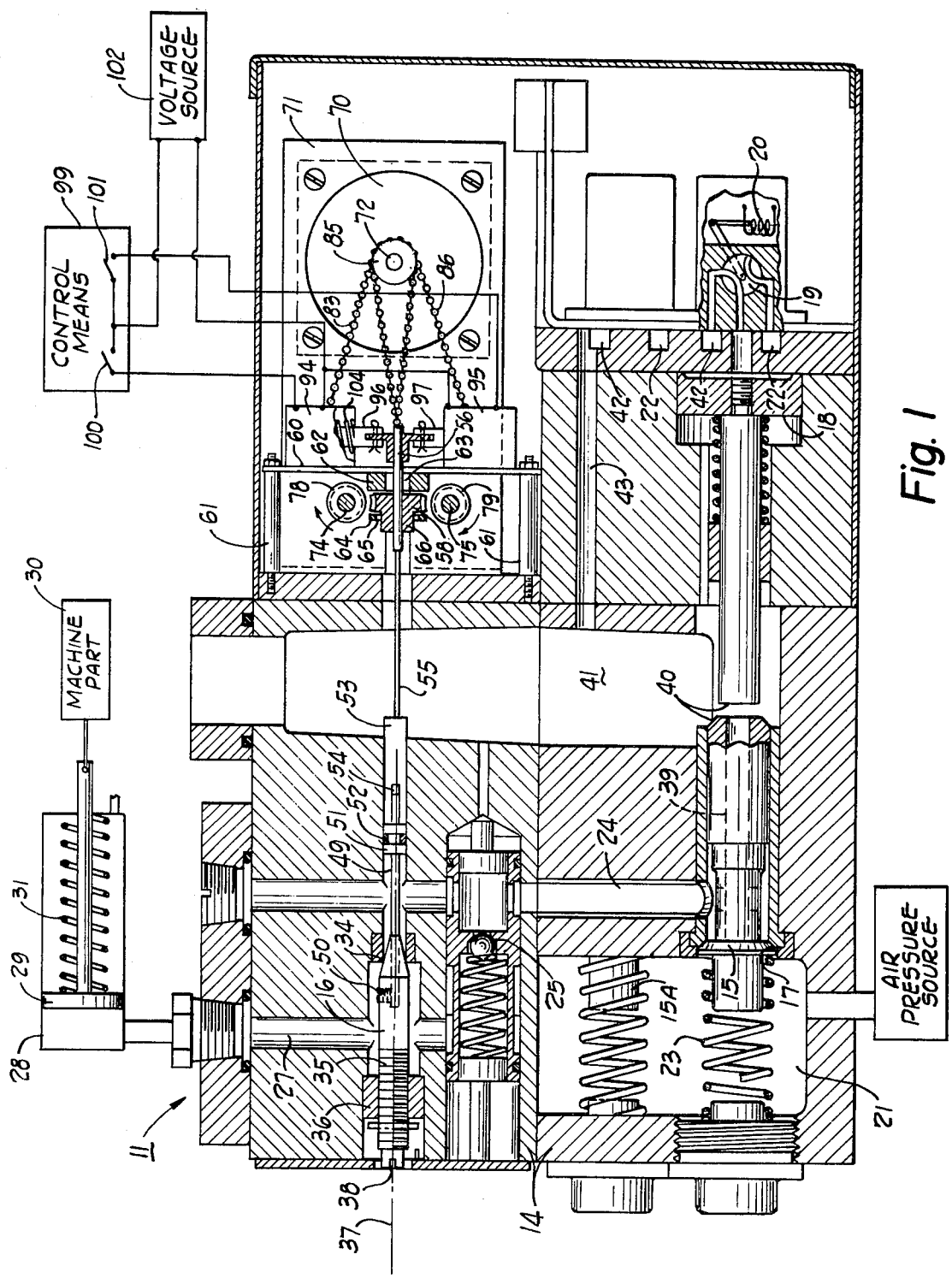
FIG. 1 is a longitudinal sectional view through one adjustable valve assembly constructed in accordance with the invention.
Figure 2:
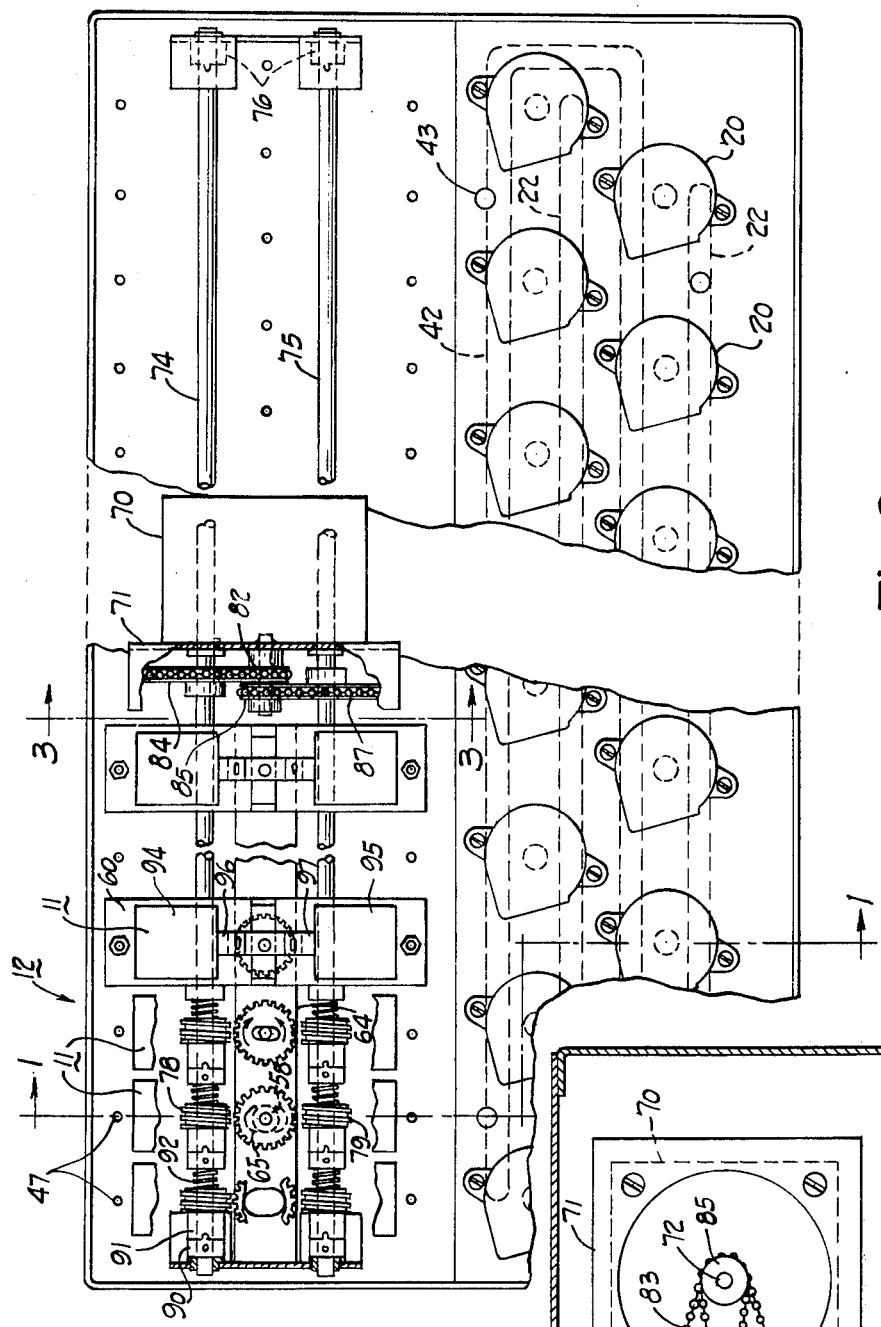
FIG. 2 is a rear elevational view of the valve assembly of FIG. 1 with parts cut away.
Figure 3:
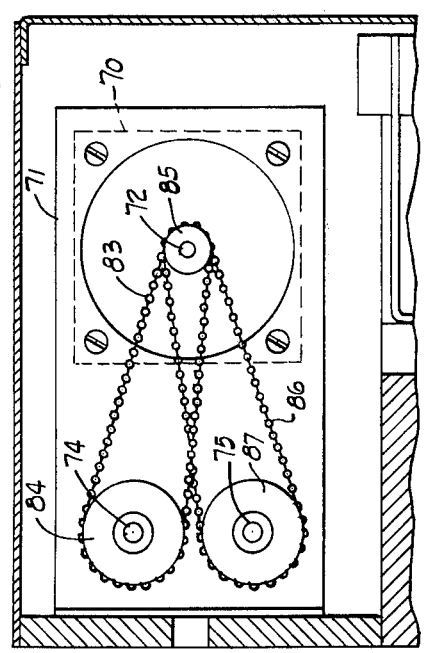
FIG. 3 is a partial sectional view on line 3—3 of FIG. 2.

FIG. 1 shows a longitudinal sectional view through an adjustable valve assembly 11 which is one valve body in a ganged valve assembly 12 shown in FIG. 2. This invention is useful in many applications, including individual section glassware making machines, and there may be a large plurality, for example 21, such valve assemblies 11 ganged together in side by side relationship.

Referring first to just one valve assembly 11 as shown in FIG. 1, this valve assembly includes a valve body 14 having a main valve member 15 and a needle valve member 16. The main valve member 15 cooperates with a valve seat 17 and is movable axially by an air pressure actuated piston 18 controlled by a control valve 19 moved by a solenoid 20. A high-pressure air manifold 21 is connected to a secondary manifold 22 through a conduit, not shown, and supplies air through the control valve 19 to actuate the piston 18 when the solenoid 20 is energized. Accordingly, the main valve member 15 moves to the left as viewed in FIG. 1 to open this valve against the urging of a spring 23. When this main valve 15-17 is opened, high-pressure air is supplied through a conduit 24, through a check valve or one-way valve 25 in the opening direction; and, through a conduit 27 to a fluid motor 28. This fluid motor 28 is shown as being of the piston and cylinder type having a piston 29 connected to move a machine part 30. As an example, this may be a part of an individual section glassware making machine. When the main valve 15-17 is closed, the piston 29 returns to its original position, as by a spring 31, and air is pushed back through the conduit 27. This return air cannot go through the now closed check valve 25, and, hence, must go through the needle valve. The needle valve member 16 cooperates with a valve seat 34 and is movable axially to achieve a variable orifice therewith. The needle valve member 16 is threaded at 35 for cooperation with a nut 36 carried in the valve body 14. Accordingly, rotation of the valve member 16 about the first axis 37 will establish an axial movement of the valve member 16 relative to the valve seat 34 for this variable orifice. An externally available screwdriver slot 38 permits external manual adjustment of this needle valve 16-34.

During the return of the machine part 30 by the spring 31, the air being forced back by the piston 29 goes through the conduit 27 and through the needle valve 16-34, the conduit 24 and an exhaust conduit 39 in the main valve member 15 and through an actuator valve 40 to an exhaust manifold 41. The actuator valve 40 is closed when the solenoid actuated control valve 18-20 is actuated to open the main valve 15-17. This prevents loss of high-pressure air to the exhaust manifold 41. The exhaust manifold 41 is connected to a secondary exhaust manifold 42 by a conduit 43 to serve as an exhaust for each of the plurality of solenoid-actuated control valves 19.

NEEDLE VALVE ACTUATION

The invention provides a means for powered actuation of the needle valve 16-34 in both opening and closing directions. It also provides for motorized actuation of the needle valves in each of the plurality of valve blocks 11, with the valve blocks 11 being ganged together in an assembly 12 as shown in FIG. 2. This FIG. 2 shows a plurality of the valve assemblies 11 which may be 21 in number for example; and FIG. 2 also shows the secondary high-pressure air manifold 22 and the secondary exhaust manifold 42 which are connected along the rear of each of these adjustable valve assemblies 11. The plurality of solenoids 20 are also indicated on this FIG. 2. The longitudinal center lines 47 of each of the adjustable valve assemblies 11 are indicated in FIG. 2.

A rod 49 is fixed in the inner end of the needle valve member 16 as by a set screw 50. This rod is connected to a plug 51 bearing an o-ring seal 52. A second plug 53 is connected to the first plug 51 by a longitudinally slidable connection 54 which connects together the two plugs for common rotation. A movable shaft 55 is connected to the second plug 53, and this shaft 55 is movable in the valve body 14 in a first plane which contains the first axis 37. This first plane is the plane of the paper of FIG. 1. The shaft means 49, 55 is movable both longitudinally of the axis and also transversely of the axis in this first plane. In order for the shaft 55 to be movable transversely it may be rigid and have a universal joint connection with the second plug 53, or as shown, this shaft 55 may be flexible. An extension 56 extends from the movable shaft 55 and carries a worm wheel 58 fixed thereon.

Plates 60 extend along the rear of the ganged valve assemblies 12 and are supported by studs 61 in spaced relationship thereto. Each plate carries a bearing block 62 for each of the movable shaft extensions 56. Each bearing block 62 has an elongated aperture 63 to guide the shaft extension 56 in its transverse movement in the first plane of the paper of FIG. 1. A sub-plate 64 also extends along the rear of the ganged valve assembly 12 and has an elongated aperture 65 for each adjustable valve assembly 11 to guide a hub 66 attached to each worm wheel 58 in the aforesaid transverse movements. In this manner the worm wheel 58 is accurately held and guided for such transverse movements.

A motor 70, which may be a constantly running unidirectional motor, is mounted on a plate 71 secured to the rear of the ganged valve assembly 12. The motor 70 has an output shaft 72 which drives line shaft means. The line shaft means includes first and second line shaft 74 and 75. These line shafts are journalled in bearings 76 carried on the rear of the ganged valve assembly 12, and the two line shafts are substantially parallel to each other and are in a second plane substantially normal to the first axis 37. Also, such second plane is substantially normal to the axis of each of the needle valves in each of the adjustable valve assemblies 11.

First and second drive trains are provided from the first and second line shafts 74 and 75, respectively, to the needle valve member 16. These drive trains include a first and a second worm 78 and 79 fixed on the first and second line shafts 74 and 75, respectively. First and second clutch means are provided in the first and second drive trains, respectively, and, in this preferred embodiment, the first and second clutch means include the transverse movement of the worm wheel 58 in order to selectively engage either the first worm 78 or the second worm 79. This is the reason for the lateral movement of the shaft extension 56 and the elongated apertures 63 and 65. Normally, the worm wheel 58 is in a neutral intermediate position out of engagement with either of the worms 78 and 79 so that the needle valve member 16 is at rest at some predetermined orifice. With the worms 78 and 79 constantly rotating from the motor 70, when the worm wheel 58 is caused to engage with either of these two worms, then the needle valve member 16 will be rotated to change the variable orifice.

The drive train from the motor 70 to the line shafts 74 and 75 includes the output shaft 72 having sprockets 82 and 85 which drive chains 83 and 86 in turn driving sprockets 84 and 87 on the line shafts 74 and 75. In this manner the two line shafts rotate in the same direction, for example, counter-clockwise, as viewed in FIG. 1. When the worm wheel 58 is moved to engage a worm 78, then it will rotate clockwise as viewed in FIG. 2 to provide a closing movement to the needle valve 16-34.

As best shown in FIG. 2, overload release clutches are also provided in the drive trains between the motor 70 and the needle valve 16-34. This may be important should the needle valve member 16 accidentally be driven completely against the seat 34, and thus, be unable to turn further. This overload release clutch for each of the valve assemblies includes a first clutch part 90 fixed on the line shaft such as line shaft 74. The overload release clutch has a second part 91 fixed for rotation with the worm 78. These two parts may be a friction clutch, but as shown are a dog clutch and are urged together by a spring 92. Should the needle valve member 16 reach the physical limit of its travel, then the two parts 90 and 91 are capable of being separated and stressing the spring 92 to permit slippage. Each worm in the ganged valve assembly 12 is so provided with an overload release clutch.

Actuator means is provided in the ganged valve assembly 12, one for each of the adjustable valve assemblies 11. The actuator means includes first and second solenoids 94 and 95 with first and second plungers 96 and 97, respectively. Control means 99 is connected to control the actuator means 94, 95. The control means 99 includes first and second switches 100 and 101, respectively, which are connected to a voltage source 102 and to the solenoids 94 and 95 so that when the switches 100 and 101 are closed, they selectively actuate the solenoids 94 and 95, respectively.

OPERATION

The control means 99 has first and second conditions connected to control the actuator means 94, 95, and also has a third neutral condition of non-actuation of the actuator means. The FIG. 1 illustrates this third neutral condition wherein both switches 100 and 101 are open. If the switch 100 is closed, for example, this energizes the solenoid actuator means 94. The movable shaft 55 is thus moved upwardly in FIG. 1 so that the worm wheel 58 engages the worm 78. The constantly running motor 70 and first line shaft 74 provides power so that the worm wheel 58 is rotated. If the first line shaft rotates counter-clockwise as viewed in FIG. 1, then the driven worm wheel 58 will rotate clockwise as viewed in FIG. 2 for an opening movement of the needle valve member 16 relative to the valve seat 34. Conversely, if the second condition of the control means is established by a closing of the switch 101, with switch 100 open, this energizes the solenoid actuator means 95. The movable shaft 55 will be moved downwardly as viewed in FIG. 1 so that the worm wheel 58 engages the worm 79. With a counter-clockwise rotation of the second line shaft 75 as viewed in FIG. 1, this provides a counter-clockwise rotation of the driven worm wheel 58 as viewed in FIG. 2 for a closing movement of the needle valve member 16 toward the valve seat 34.

The solenoids contain springs such as spring 104 to urge the plungers 96 and 97 outwardly and these springs provide an urging of the worm wheel 58 to a neutral position out of driving engagement with each of the line shafts 74 and 75.

It will be noted that the line shafts 74 and 75 have driving engagement with diametrically opposite portions of the driven wheel 58 in order to establish opposite rotational driven directions of the valve member 16 with the same rotational direction of the line shafts.

The above description shows that the adjustable valve assembly 11 may be adjusted by the control means 99 controlling the actuator means 94, 95 so that either a first clutch means 78, 58, or a second clutch means 79, 58 may be engaged in the first and second drive trains, respectively. This provides selective opening or closing movements of the needle valve 16, 34.

As best shown in FIG. 2, it will be noted that the solenoids 20 are staggered along a zig-zag path, and this is for the purpose of conserving space in the plurality of valve assemblies 11 ganged together. In adjacent valve assemblies 11, the main valves 15 are staggered and an adjacent main valve 15A is shown in FIG. 1, which is out of the plane of the main valve 15 of FIG. 1.

Also, it will be appreciated that the check valve 25 may be reversed so that the main airflow therethrough can have a reversed direction. By so doing, during the return movement of the machine part 30, air will readily travel through the check valve 25. Yet, during the initial forward movement of the machine part 30, air must travel through the needle valve 16-34. This can be a velocity control of the forward movement of the machine part, rather than a velocity control of the return movement of the machine part, as described in detail above.

The present disclosure includes that contained in the appended claims, as well as that of the foregoing description. Although tis invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is :

1. A ganged valve assembly including a plurality of valve bodies;
    each of said valve bodies including a valve seat and a valve member movable in a first plane along a valve axis in two directions relative to the respective valve seat to establish a variable orifice therewith,
    a motor,
    line shaft means connected to be driven by said motor and journalled for rotation about a second axis and transverse to said plurality of valve bodies in a second plane substantially normal to said first axis,
    each of said valve bodies including first and secong drive trains from said line shaft means to the respective valve member,
    first and second clutch means in each of said first and second drive trains, respectively,
    and actuator means connected to actuate each of said first and second clutch means.

2. A valve assembly as set forth in claim 1, wherein said line shaft means is constantly driven by said motor and each of said valve members is nominally at rest except when selectively driven by said line shaft means during actuation of one of said first and second clutch means.

3. A valve assembly as set forth in claim 1, wherein said actuator means includes solenoid means connected to actuate said first and second clutch means.

4. A valve assembly as set forth in claim 3, including control means having first and second switch means for controlling said solenoid means.

5. A valve assembly as set forth in claim 1, wherein said line shaft means includes first and second parallel line shafts in said second plane and connected in each of said first and second drive trains, respectively.

6. A valve assembly as set forth in claim 5, including a driven wheel non-rotatively connected to each said valve member, and said first and second clutch means includes driving connections from said first and second line shafts to said driven wheel.

7. A valve assembly as set forth in claim 6, wherein said actuator means includes first and second solenoids connected to said driven wheel, and said clutch means including spring means urging each of said driven wheels to a neutral position out of driving engagement with each of said first and second line shafts.

* * * * *